United States Patent
Matsukawa

(10) Patent No.: US 6,765,614 B1
(45) Date of Patent: Jul. 20, 2004

(54) PIXEL DEFECT COMPENSATION APPARATUS AND METHOD OF COMPENSATING PIXEL DEFECT

(75) Inventor: Nobuyuki Matsukawa, Yokosuka (JP)

(73) Assignee: Victor Company of Japan, Ltd., Kanagawa-ken (JP)

(*) Notice: Subject to any disclaimer, the term of this patent is extended or adjusted under 35 U.S.C. 154(b) by 0 days.

(21) Appl. No.: 09/366,384

(22) Filed: Aug. 3, 1999

(30) Foreign Application Priority Data

Aug. 4, 1998 (JP) ............................................ 10-220165

(51) Int. Cl.$^7$ ................................................. H04N 9/64
(52) U.S. Cl. ........................................................ 348/246
(58) Field of Search ................................ 348/246, 247, 348/272, 273, 279, 280, 616

(56) References Cited

U.S. PATENT DOCUMENTS

| | | | |
|---|---|---|---|
| 5,327,246 A | * 7/1994 | Suzuki | 348/246 |
| 5,805,217 A | * 9/1998 | Lu et al. | 348/273 |
| 6,028,628 A | * 2/2000 | Van Der Valk | 348/246 |
| 6,529,238 B1 | * 3/2003 | Mahant-Sheti et al. | 348/246 |

FOREIGN PATENT DOCUMENTS

| | | |
|---|---|---|
| JP | 5-075927/1993 | 3/1993 |
| JP | 8-237521 | 9/1996 |

* cited by examiner

Primary Examiner—Wendy R. Garber
Assistant Examiner—Rashawn N Tillery
(74) Attorney, Agent, or Firm—Anderson, Kill & Olick, P.C.; Eugene Lieberstein; Michael N. Meller

(57) ABSTRACT

A value of CCD signal of a specific pixel and a maximum value of CCD signals of neighboring pixels, which are presented in a neighboring area of the specific pixel and are a same color component as that of the specific pixel, are extracted. In case that a value of subtracting the maximum value of CCD signals of neighboring pixels from the value of CCD signal of the specific pixel exceeds a predetermined value, it is discriminated that a pixel of white defect is presented in the specific pixel and the pixel of white defect is compensated by replacing the value of CCD signal of the specific pixel with the maximum value. In case that a value of subtracting the maximum value of CCD signals of neighboring pixels from the value of CCD signal of the specific pixel does not exceed a predetermined value, it is discriminated that a pixel of white defect is not presented in the specific pixel and the pixel of white defect is compensated by outputting the value of CCD signal of the specific pixel as it is.

3 Claims, 4 Drawing Sheets

| La0 | A | B | A | B | A |
|---|---|---|---|---|---|
| La1 | B | A | B | A | B |
| La2 | A | B | A | B | A |

Fig. 4(a)

| Lb0 | C | D | C | D | C |
|---|---|---|---|---|---|
| Lb1 | D | C | D | C | D |
| Lb2 | C | D | C | D | C |

Fig. 4(b)

| La0 | a | b | c | d | e |
|---|---|---|---|---|---|
| La1 | f | g | h | i | j |
| La2 | k | l | m | n | o |

Fig. 5

PIXEL DEFECT COMPENSATION APPARATUS AND METHOD OF COMPENSATING PIXEL DEFECT

BACKGROUND OF THE INVENTION

1. Field of the Invention

The present invention relates to a pixel defect compensating apparatus and a method of compensating pixel defect, particularly, relates to an apparatus and a method of compensating pixel defect of a solid-state image sensor by means of signal processing in an image pickup apparatus utilizing a solid-state image sensor of all-pixel readout system.

2. Description of the Related Art

Generally, it is well known that a pixel is deteriorated by sectional defect of semiconductor such as crystal defect in a solid-state image sensor such as a CCD (Charge-Coupled Device), which is produced from semiconductor. Such pixel defect as always adding a certain bias voltage to an image output in response to an amount of incident light appears on a monitor screen as a white spot in high intensity if a signal of the pixel defect is processed as it is. The white spot is called as a pixel of white defect.

FIG. 1 is a diagram of depicting a method of compensating pixel defect by a pixel defect compensating apparatus, which compensates a pixel of white defect of an interline solid-state image sensor, hereinafter called an interline CCD (IT-CCD), of the prior art. An IT-CCD reads out pixel signals in the interline transfer system. CCD signals, which are outputted from an IT-CCD, are processed to eliminate noise components prior to compensating pixels of white defect and adjusted to a predetermined signal level, and then converted into digital signals.

CCD signals, which are obtained from 2 pixels in horizontal direction and converted into a digital configuration, are mixed and called a luminance signal. The luminance signal is written in plurality of line memories by each line and compensates a pixel of white defect. FIG. 1 is an example of compensating pixels of white defect included in luminance signals for 3 lines with providing line memories for 2 lines. Pixels of white defect in luminance signals for 3 lines are compensated by utilizing luminance signals for total 3 lines, which are composed of luminance signals for 2 lines read out from the line memories and a luminance signal for one line to be inputted succeeding to the 2 lines.

In FIG. 1, each 3 pixels continuing in horizontal direction are arranged in continuing 3 lines, that is, a first line L0, a second line L1, and a third line L2 respectively. In other words, 3 pixels "a" through "c" are arranged in the line L0, and 3 pixels "d" through "f" are arranged in the line L1, and 3 pixels "g" through "i" are arranged in the line L2.

According to the method of compensating pixel defect of the prior art, a pixel of white defect at the pixels "b", "e", and "h" shown in FIG. 1 is compensated by utilizing luminance signals of total 9 pixels forming a matrix of 3 pixels horizontally and 3 pixels vertically. In addition thereto, the compensation is applied to luminance signals for 3 lines together and not for each line so as to prevent a vertical aperture signal from a pixel of white defect, which may be included in the vertical aperture signal.

Compensation of a pixel of white defect in the pixel "e" is depicted first. Luminance signals of the pixels "d" and "f" are compared with each other and a lower signal level of them is defined "Y1L" as a representative value. Luminance signals of 6 pixels including pixels "a" through "c" and "g" through "i" are compared with each other and a highest signal level of them is defined "Y1H" as a representative value. Then, with comparing the representative values "Y1L" and "Y1H", a larger value of them is defined "Y1". In case that a value of subtracting the value "Y1" from a luminance signal value of the pixel "e" exceeds a predetermined threshold value, it is discriminated that a pixel of white defect is presented in the pixel "e".

In the case of being discriminated that a pixel of white defect is presented in the pixel "e" as mentioned above, the pixel of white defect is compensated by replacing the luminance signal value of the pixel "e" with the value "Y1". On the other hand, in case that a value of subtracting the value "Y1" from a luminance signal value of the pixel "e" does not exceed a predetermined threshold value, it is discriminated that a pixel of white defect is not presented in the pixel "e". Then, the luminance signal value of the pixel "e" is utilized as it is.

In case that a pixel of white defect in the pixel "b" is compensated, luminance signals of the pixels "a" and "c" are compared with each other and a lower signal level of them is defined "Y0L" as a representative value. Luminance signals of pixels "d" through "f" are compared with each other and a highest signal level of them is defined "Y0H" as a representative value. Then, with comparing the representative values "Y0L" and "Y0H", a larger value of them is defined "Y0". In case that a value of subtracting the value "Y0" from a luminance signal value of the pixel "b" exceeds a predetermined threshold value, it is discriminated that a pixel of white defect is presented in the pixel "b".

In the case of being discriminated that a pixel of white defect is presented in the pixel "b" as mentioned above, the pixel of white defect is compensated by replacing the luminance signal value of the pixel "b" with the value "Y0". On the other hand, in case that a value of subtracting the value "Y0" from a luminance signal value of the pixel "b" does not exceed a predetermined threshold value, it is discriminated that a pixel of white defect is not presented in the pixel "b". Then, the luminance signal value of the pixel "b" is utilized as it is.

In addition thereto, in case that a pixel of white defect in the pixel "h" is compensated, luminance signals of the pixels "g" and "i" are compared with each other and a lower signal level of them is defined "Y2L" as a representative value. Luminance signals of pixels "d" through "f" are compared with each other and a highest signal level of them is defined "Y2H" as a representative value.

Then, with comparing the representative values "Y2L" and "Y2H", a larger value of them is defined "Y2". In case that a value of subtracting the value "Y2" from a luminance signal value of the pixel "h" exceeds a predetermined threshold value, it is discriminated that a pixel of white defect is presented in the pixel "h".

In the case of being discriminated that a pixel of white defect is presented in the pixel "h" as mentioned above, the pixel of white defect is compensated by replacing the luminance signal value of the pixel "h" with the value "Y2". On the other hand, in case that a value of subtracting the value "Y2" from a luminance signal value of the pixel "h" does not exceed a predetermined threshold value, it is discriminated that a pixel of white defect is not presented in the pixel "h". Then, the luminance signal value of the pixel "h" is utilized as it is.

Accordingly, in case that a luminance signal level of one pixel is extremely higher than those of adjacent pixels, the pixel is discriminated as a pixel of white defect and compensated as mentioned above.

However, with respect to a recent single-unit video camera-recorder utilizing a solid-state image sensor such as a CCD, a need for obtaining one blur-free still picture signal composed of moving picture signals including even and odd fields is increasing in conjunction with promoting higher image quality. In some cases, a progressive scan CCD, hereinafter called a PS-CCD, of all-pixel readout system is utilized for such a single-unit video camera-recorder not an IT-CCD, which reads out a pixel signal in the interline transfer system.

In case that a pixel of white defect in a CCD signal obtained from such a PS-CCD is compensated by a pixel defect compensating apparatus of the prior art with a luminance signal, which is obtained by mixing 2 pixels in horizontal direction, it causes a problem of deteriorating resolution. Further, in case that a pixel of white defect is compensated by a CCD signal, prior to mixing 2 pixels in horizontal direction, with comparing the CCD signal with adjacent pixels within such a simple compensating area as disclosed in the prior art, it causes another problem that a pixel of white defect can not be correctly discriminated or can not be properly compensated due to difference of signal levels of each color component in a CCD signal outputted from a solid-state image sensor.

SUMMARY OF THE INVENTION

Accordingly, to improve the above mentioned problems, there provided a pixel defect compensating apparatus, which comprises extracting means for extracting a pixel signal outputted form a solid-state image sensor of all-pixel readout system and composed of a same color component from an array of pixel signals indicating one color component out of a plurality of color components of pixel information of one pixel within a predetermined area of a picture, pixel defect discriminating means for comparing pixel information of a specific pixel in the pixel signal extracted by the extracting means with pixel information of other pixels than the specific pixel in the pixel signal and for discriminating whether or not pixel defect is presented in the specific pixel, and pixel defect compensating means for compensating pixel information of the specific pixel by using pixel information of pixels other than the specific pixel in the pixel signal and for outputting a compensated pixel information, in case that the specific pixel is discriminated by the pixel defect discriminating means such that a pixel defect is presented, and for outputting the pixel information of the specific pixel as it is, in case that the specific pixel is discriminated by the pixel defect discriminating means such that a pixel defect is not presented in the specific pixel. The pixel defect discriminating means discriminate that there is presented a pixel defect in the specific pixel, in case that a value of subtracting a maximum signal level of pixels other than the specific pixel from the signal level of the specific pixel exceeds a predetermined value. The pixel defect compensating means compensate pixel information of the specific pixel by replacing the value of signal level of the specific pixel with the value of the maximum signal level, in case of being discriminated that a pixel defect is presented in the specific pixel.

According to an aspect of the present invention, there provided a method of compensating pixel defect, which comprises a step of extracting a pixel signal outputted from a solid-state image sensor of all-pixel readout system and composed of a same color component from an array of pixel signals indicating one color component out of a plurality of color components of pixel information of one pixel within a predetermined area of a picture, a step of comparing pixel information of a specific pixel in the pixel signal extracted by the step of extracting with pixel information of other pixels than the specific pixel in the pixel signal, a step of discriminating whether or not pixel defect is presented in the specific pixel, a step of compensating pixel information of the specific pixel by using pixel information of pixels other than the specific pixel in the pixel signal, in case that the specific pixel is discriminated by the pixel defect discriminating means such that pixel defect is presented, a step of firstly outputting a compensated pixel information, in case of being discriminated that pixel defect is presented in the specific pixel, and a step of secondly outputting the pixel information of the specific pixel as it is, in case that the specific pixel is discriminated such that pixel defect is not presented in the specific pixel.

In addition thereto, the step of discriminating pixel defect further discriminates that there is presented a pixel defect in the specific pixel, in case that a value of subtracting a maximum signal level of pixels other than the specific pixel from a signal level of the specific pixel exceeds a predetermined value, and the step of compensating pixel information of the specific pixel further compensates pixel information of the specific pixel by replacing the value of signal level of the specific pixel with the value of the maximum signal level, in case of being discriminated that a pixel defect is presented in the specific pixel.

Other object and further features of the present invention will be apparent from the following detailed description when read in conjunction with the accompanying drawings.

BRIEF DESCRIPTION OF DRAWINGS

FIG. 4(a) shows a diagram of depicting a CCD signal outputted from a PS-CCD through one transmission line Sa.

FIG. 4(b) shows another diagram of depicting a CCD signal outputted from a PS-CCD through another transmission line Sb.

FIG. 5 shows a diagram of depicting a method of compensating pixel defect by a pixel defect compensating apparatus according to the embodiment of the present invention.

DETAILED DESCRIPTION OF THE PREFERRED EMBODIMENTS

[Embodiment]

Figures 1, 2, 3:
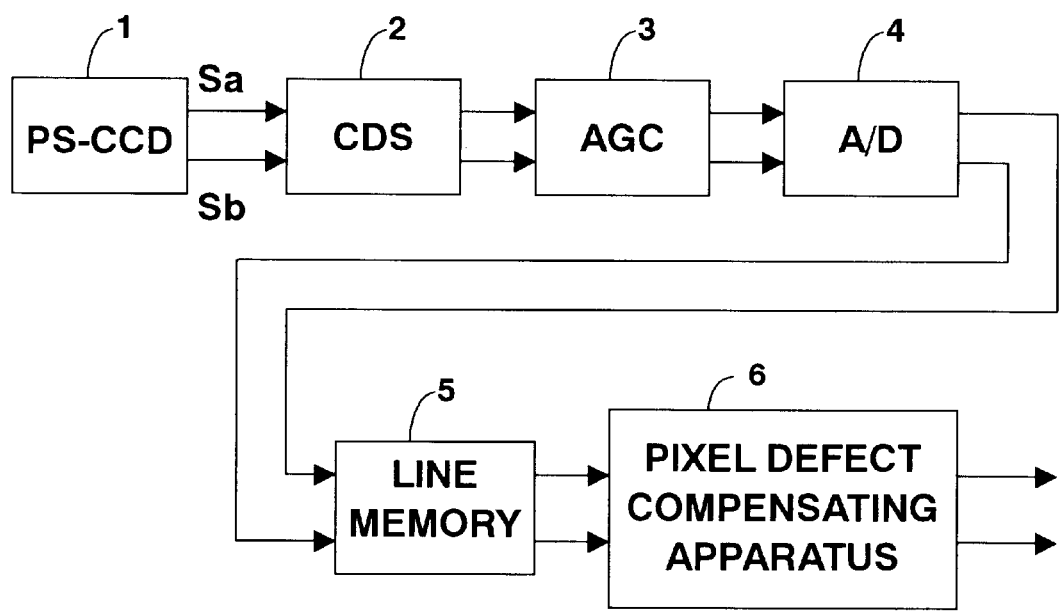
FIG. 1 shows a configuration of pixels for depicting a method of compensating pixel defect by a pixel defect compensating apparatus of the prior art.
FIG. 2 shows a diagram of depicting a signal flow from a solid-state image sensor to a pixel defect compensating apparatus according to an embodiment of the present invention.
FIG. 3 shows an exemplary filter arrangement of a CCD filter in a progressive scan CCD (PS-CCD).

FIG. 2 depicts a signal flow of a CCD signal outputted from a progressive scan CCD (PS-CC) 1 to a pixel defect compensating apparatus 6 through transmission lines Sa and Sb.

In FIG. 2, a CCD signal of whole pixels outputted from the PS-CCD 1 is transmitted to the pixel defect compensating apparatus 6 by way of a CDS (Correlated Double Sampling) circuit 2, an AGC (Automatic Gain Control) circuit 3, an analog to digital (A/D) converter 4, and a line memory 5 through the transmission lines Sa and Sb. The CDS circuit 2 eliminates noise components from the CCD signal. The AGC circuit 3 adjusts the CCD signal to a predetermined level. The A/D converter 4 converts the CCD signal in analog to digital. The line memory 5 can store two lines of CCD signals in digital for the transmission line Sa and two lines of CCD signals in digital for the transmission line Sb. The pixel defect compensating apparatus 6 is inputted with three lines of CCD signals in digital for respective transmission lines Sa and Sb at the same time and compensates a pixel of white defect for three lines of the CCD signals respectively and outputs compensated CCD signals.

Accordingly, the pixel defect compensating apparatus 6 in accordance with the present invention compensates pixels of white defect for three lines of CCD signals outputted from the line memory 5 simultaneously and outputs compensated CCD signals. FIG. 3 shows an exemplary filter arrangement of CCD filters of the PS-CCD 1. The PS-CCD 1 is equipped with 4 CCD filters "A" through "D", that is, color component transmission filters "A" through "D". For example, the filters "A", "B", "C", and "D" are filters of transmitting white, green, cyan, and yellow respectively.

The PS-CCD 1 outputs CCD signals of color components "A" and "B" alternately through the transmission line Sa as shown in FIG. 4(a) and outputs CCD signals of color components "C" and "D" alternately through the transmission line Sb as shown in FIG. 4(b).

As shown in FIG. 3, a line composed of a CCD filter for the color component "A" and another CCD filter for the color component "B" is arranged in every other line in a vertical direction with arranging the respective CCD filters reversely. In addition thereto, a line composed of a CCD filter for the color component "C" and another CCD filter for the color component "D" is arranged in every other line in a vertical direction with arranging the respective CCD filters reversely.

Accordingly, in a line La0 outputted from the transmission line Sa, a CCD signal is outputted in alphabetical order of the color components "A" and "B" as shown in FIG. 4(a). On the other hand, in a line La1 succeeding the line La0, a CCD signal is outputted in accordance with an order of the color components "B" and "A" not in alphabetical order. In addition thereto, in a line La2 succeeding the line La1, a CCD signal is outputted in alphabetical order of the color components "A" and "B" as the same order of the color components as that of the line La0. In a line Lb0 outputted from the transmission line Sb, a CCD signal is outputted in alphabetical order of the color components "C" and "D" as shown in FIG. 4(b). In a line Lb1 succeeding the line Lb0, a CCD signal is outputted in accordance with an order of the color components "D" and "C" not in alphabetical order. In addition thereto, in a line Lb2 succeeding the line Lb1, a CCD signal is outputted in accordance alphabetical order as the same order of the color components as that of the line Lb0.

Accordingly, a CCD signal outputted from the PS-CCD 1 is inputted to the line memory 5 by way of the CDS circuit 2, the AGC circuit 3, and the A/D converter 4. Then CCD signals of continuing three lines are simultaneously inputted to the pixel defect compensating apparatus 6.

Using FIG. 5 depicts a compensating device for a pixel of white defect in the pixel defect compensating apparatus 6.

Since a same method of compensating a pixel of white defect is applied to both the transmission lines Sa and Sb, compensation of a pixel of white defect is depicted herein only for the color components "A" and "B" although a CCD signal of the color components "A" and "B" from the transmission line Sa and a CCD signal of the color components "C" and "D" from the transmission line Sb are inputted to the pixel defect compensating apparatus 6.

A pixel of white defect in pixels "c", "h", and "m" will be compensated hereinafter by using a CCD signal of 15 pixels in total forming a matrix of 5 pixels in horizontal and 3 pixels in vertical as shown in FIG. 5. However, it is also acceptable to compensate pixels of white defect in the pixels "c", "h", and "m" by using more pixels than 15.

In FIG. 5, pixels "a" through "e" are a CCD signal of the line La0, pixels "f" through "j" are a CCD signal of the line La1, and pixels "k" through "o" are a CCD signal of the line La2. A pixel defect compensating apparatus in accordance with the present invention can compensate a pixel of white defect in pixels "c", "h", and "m" by using a CCD signal of 15 pixels forming a matrix of 5 pixels in horizontal and 3 pixels in vertical as shown in FIG. 5.

Compensating a pixel of white defect in the pixel "h" is depicted first. CCD signals of three lines composed of the lines La0 through La2 from the line memory 5 are simultaneously inputted to the pixel defect compensating apparatus 6 as mentioned above, wherein the color components "A" and "B" are inputted alternately to the pixel defect compensating apparatus 6 as a CCD signal. In case that the pixel "h" is a CCD signal of the color component "B", the pixels "b", "d", "f", "j", "l" and "n" are a CCD signal of the color component "B" respectively and the pixels "a", "c", "e", "g", "i", "k", "m", and "o" are a CCD signal of the color component "A" respectively.

Since there is signal level difference of CCD signals between the color components "A" and "B", it can not be correctly discriminated whether or not a pixel of white defect is existed in the pixel "h", which is a CCD signal of the color component "B". Therefore, a CCD signal of a pixel, which is the same color component as that of the pixel "h" is utilized for compensating a pixel of white defect in the pixel "h".

At first, the pixel defect compensating apparatus 6 compares CCD signals of 6 pixels in total such as the pixels "b", "d" , "f", "j", "l", and "n", which are presented in a neighboring area of the pixel "h" and the same color component as that of the pixel "h", and then a highest signal level is defined as a maximum level C1H. In case that a value subtracting the C1H from a value Ch of a CCD signal of the pixel "h" exceeds a predetermined threshold value, it is discriminated that a pixel of white defect is presented in the pixel "h".

In case of being discriminated that a pixel of white defect is presented in the pixel "h", the pixel of white defect is compensated by replacing the value Ch of the CCD signal in the pixel "h" with the maximum value C1H. On the other hand, in case that a value subtracted the C1H from the Ch of the CCD signal of the pixel "h" does not exceed the predetermined threshold value, it is discriminated that there is no pixel of white defect in the pixel "h" and the value Ch is outputted as the CCD signal of the pixel "h" as it is.

In case of compensating a pixel of white defect in the pixel "c", the pixel defect compensating apparatus 6 compares CCD signals of 4 pixels in total such as the pixels "a", "e", "g", and "i", which are presented in a neighboring area of the pixel "c" and the same color component as that of the pixel "c", and then a highest signal level is defined as a maximum level C0H. In case that a value subtracting the C0H from a value Cc of a CCD signal of the pixel "c" exceeds a predetermined threshold value, it is discriminated that a pixel of white defect is presented in the pixel In case of being discriminated that a pixel of white defect is presented in the pixel "c", the pixel of white defect is compensated by replacing the value Cc of the CCD signal in the pixel "c" with the maximum value C0H. On the other hand, in case that a value subtracted the C0H from the Cc of the CCD signal of the pixel "c" does not exceed the predetermined threshold value, it is discriminated that there is no pixel of white defect in the pixel "c" and the value Cc is outputted as the CCD signal of the pixel "c" as it is.

In case of compensating a pixel of white defect in the pixel "m", the pixel defect compensating apparatus 6 compares CCD signals of 4 pixels in total such as the pixels "g", "i", "k", and "o", which are existed in a neighboring area of the pixel "m" and the same color component as that of the pixel "m", and then a highest signal level is defined as a maximum level C2H. In case that a value subtracting the maximum value C2H from a value Cm of a CCD signal of the pixel "m" exceeds a predetermined threshold value, it is discriminated that a pixel of white defect is presented in the pixel "m".

In case of being discriminated that a pixel of white defect is presented in the pixel "m", the pixel of white defect is compensated by replacing the value Cm of the CCD signal in the pixel "m" with the maximum value C2H. On the other hand, in case that a value subtracted the C2H from the Cm of the CCD signal of the pixel "m" does not exceed the predetermined threshold value, it is discriminated that there is no pixel of white defect in the pixel "m" and the value Cm is outputted as the CCD signal of the pixel "m" as it is.

Figure 6:
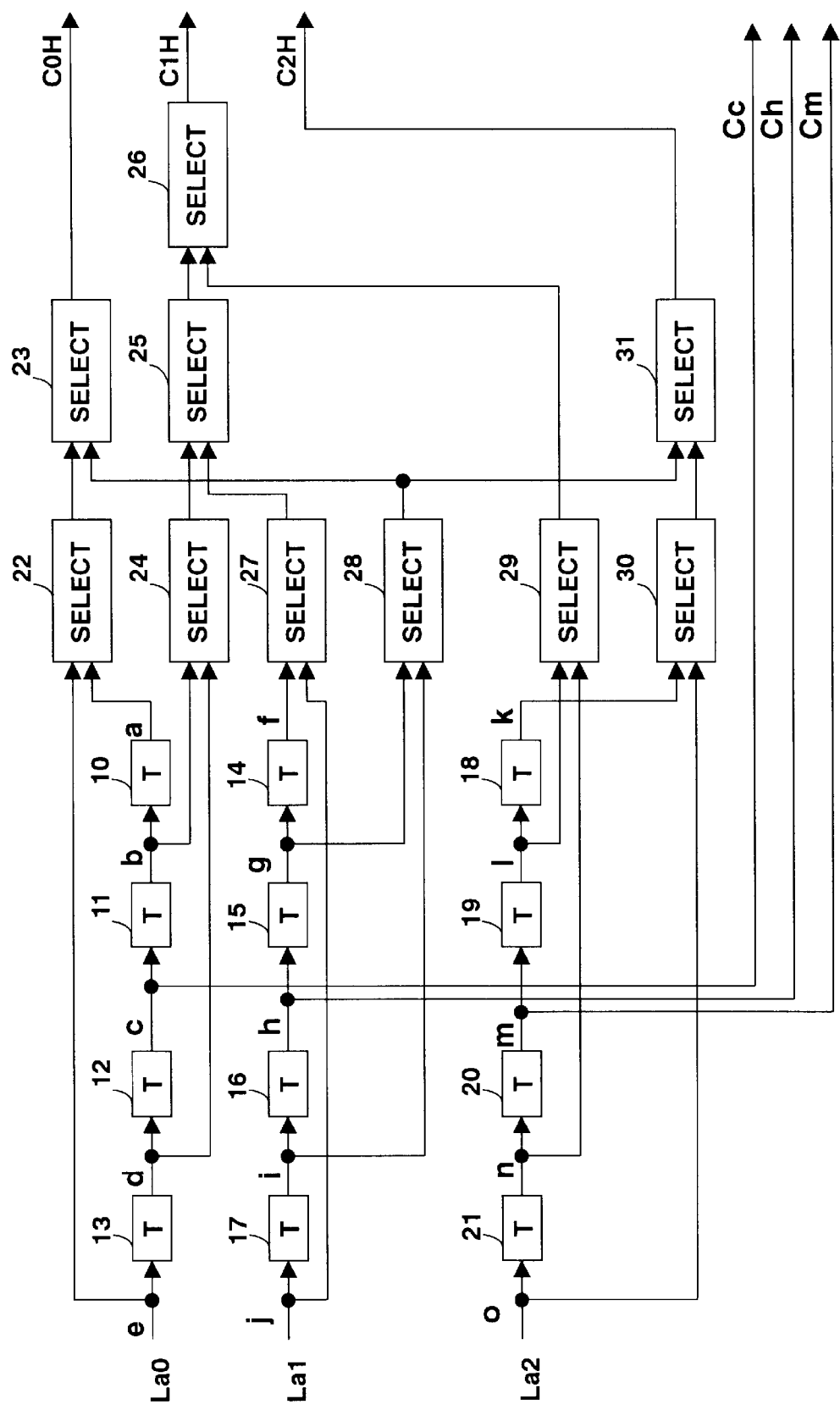
FIG. 6 shows a process of obtaining a value of CCD signal of a specific pixel and a maximum value of CCD signal in adjacent pixels, which have a same color component as that of the specific pixel.
Figure 7:
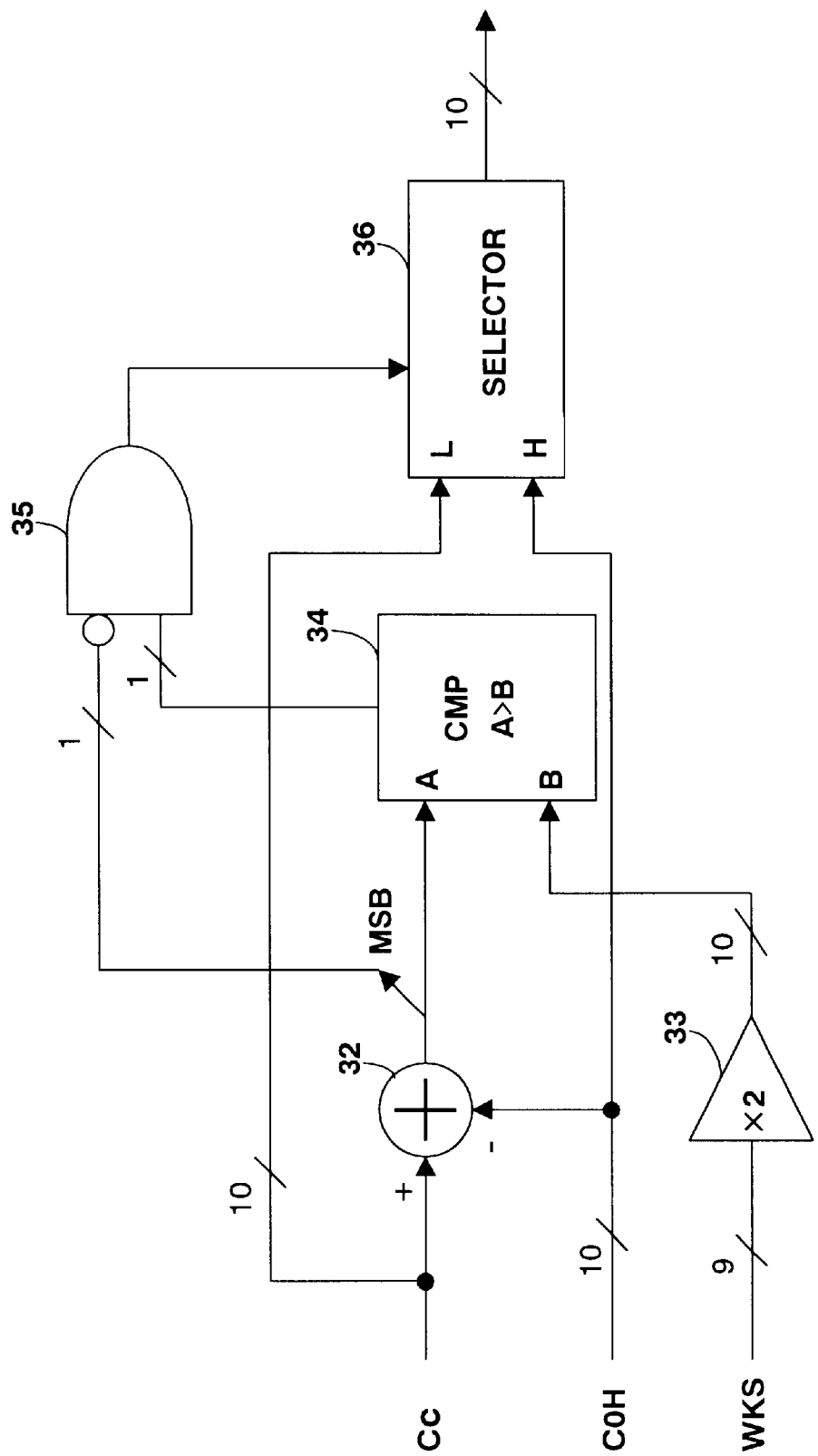
FIG. 7 shows a configuration of compensating a value of CCD signal of the specific pixel.

FIGS. 6 and 7 are block diagrams of the pixel defect compensating apparatus 6, which compensates a pixel of white defect after discriminating whether or not a pixel of white defect is presented. In addition thereto, configurations shown in FIGS. 6 and 7 are one example of the pixel defect compensating apparatus in accordance with the present invention. Therefore, any circuits, which can compensate a pixel of white defect as mentioned above with referring FIGS. 4(a) and 4(b), are also acceptable without departing from the invention concept disclosed herein.

FIG. 6 shows a configuration of obtaining the values Cc, Ch, and Cm of CCD signals of respective pixels "c", "h", and "m" and the maximum values C0H, C1H, and C2H out of the pixels "a" through "o" in the lines La0 through La2 as shown in FIG. 5. FIG. 7 shows a configuration of replacing a value of CCD signal of the pixels "c", "h", and "m" in accordance with necessity and outputting the value by using the values Cc, Ch, Cm, C0H, C1H, and C2H.

A method of obtaining values Cc, Ch, and Cm of CCD signals and maximum values C0H, C1H, and C2H is depicted by a configuration as shown in FIG. 6. In FIG. 6, reference numbers 10 through 21 are delay devices (T), which delay CCD signals inputted for one pixel and output the CCD signals delayed for one pixel to succeeding stages. Reference numbers 22 through 31 are selectively outputting (SELECT) circuits, which output one signal of higher signal level out of CCD signals inputted.

Each delay device delays a CCD signal inputted to the delay device for one pixel and outputs the delayed CCD signal whenever a CCD signal is inputted by way of lines La0 through La2, wherein the delay devices 10 through 13 output a CCD signal of the pixels "a" through "d" in FIG. 5 and the delay devices 14 through 17 output a CCD signal of the pixels "f" through "i" and the delay devices 18 through 21 output a CCD signal of the pixels "k" through "n" respectively, and wherein CCD signals of the pixels "e", "j", and "o" are inputted to the delay devices through the lines La0, La1, and La2 respectively.

The value Cc of the CCD signal at the pixel "c", the value Ch of the CCD signal at the pixel "h", and the value Cm of the CCD signal at the pixel "m" can be obtained from output signals of the delay devices 12, 16, and 20 respectively. In order to discriminate whether or not a pixel of white defect is presented in the pixel "h", it is necessary to obtain the maximum value C1H of CCD signals of total 6 pixels "b", "d", "f", "j", "l", and "n". The maximum value C1H can be obtained by following processes. The SELECT circuit 24 selects a larger value of either the pixel "b" or the pixel "d" in the line La0. The SELECT circuit 27 selects a larger value of either the pixel "f" or the pixel "j" in the line La1. The SELECT circuit 29 selects a larger value of either the pixel "l" or the pixel "n" in the line La2. The SELECT circuit 25 selects a larger value of either the line La0 or the line La1, in other words, the SELECT 25 selects a largest value of the pixels "b", "d", "f" and "j", and then the SELECT circuit 26 can obtain the maximum value C1H by selecting a larger value of two CCD signals outputted from the SELECT circuits 25 and 29. Accordingly, the maximum value C1H of the CCD signals at the above mentioned 6 pixels can be obtained.

In order to discriminate whether or not a pixel of white defect is presented in the pixel "c", it is necessary to obtain the maximum value C0H of CCD signals of total 4 pixels "a", "e", "g", and "i". The maximum value C0H of CCD signals of the 1.5 corresponding pixels can be obtained by following processes. The SELECT circuit 22 selects a larger value of either the pixel "a" or the pixel "e" in the line La0. The SELECT circuit 28 selects a larger value of either the pixel "g" or the pixel "i" in the line La1, and then the SELECT circuit 23 can obtain the maximum value C0H by selecting a larger value of two CCD signals outputted from the SELECT circuits 22 and 28, in other words, the SELECT circuit 23 can select the maximum value C0H out of the CCD signals of the pixels "a", "e", "g" and "i". Accordingly, the maximum value C0H of the CCD signals at the above mentioned 4 pixels can be obtained.

In addition thereto, for discriminating whether or not a pixel of white defect is presented in the pixel "m", it is necessary to obtain the maximum value C2H of CCD signals of total 4 pixels "g", "i", "k", and "o". The maximum value C2H of CCD signals of the corresponding pixels can be obtained by following processes. The SELECT circuit 28 selects a larger value of either the pixel "g" or the pixel "i" in the line La1. The SELECT circuit 30 selects a larger value of either the pixel "k" or the pixel "o" in the line La2, and then the SELECT circuit 31 can obtain the maximum value C2H by selecting a larger value of two CCD signals outputted from the SELECT circuits 28 and 30. In other words, the SELECT circuit 31 can select the maximum value C2H out of the CCD signals of the pixels "g", "i", "k" and "o". Accordingly, the maximum value C2H of the CCD signals at the above mentioned 4 pixels can be obtained.

Using FIG. 7 depicts compensating values of CCD signals at the pixels "c", "h", and "m". Practically, a configuration shown in FIG. 7 is provided for each line so as to compensate values of CCD signals at the pixels "c", "h", and "m" and compensate CCD signals of 3 lines simultaneously. However, compensation of the line La0, that is, the pixel "c" is only depicted herein, since a same method of compensating a pixel of white defect is applied to any lines.

As shown in FIG. 7, the configuration comprises a subtracter 32, a bit converter 33, a comparator (CMP) 34, an AND circuit 35, and a selector 36. The subtracter 32 subtracts the maximum value C0H in 10 bits from the value Cc of the CCD signal in 10 bits at the pixel "c" as shown in FIG. 5. An output of the subtracter 32 is inputted to a terminal "A" of the CMP 34. A predetermined threshold value WKS, which is supplied by 9 bits of digital signal, is converted into 10 bits of digital signal by the bit converter 33 and supplied to a input terminal "B" of the CMP 34.

The CMP 34 compares a subtracted value outputted form the subtracter 32 with the threshold value WKS. The CMP 34 outputs "1" (one) if the subtracted value is larger than the threshold value WKS or outputs "0" (zero) if the subtracted value is smaller than the threshold value WKS. An inverted signal of a most significant bit (MSB) of the subtracted value in 10 bits, which is outputted from the subtracter 32, is supplied to one of 2 input terminals of the AND circuit 35. One bit signal of "1" or "0" outputted from the CMP 34 is supplied to the other input terminal of the AND circuit 35.

The AND circuit 35 outputs a logical product of 2 input signals. In case that the AND circuit 35 outputs "1", the selector 36 selects and outputs the maximum value C0H in 10 bits. In case that the AND circuit 35 outputs "0", the selector 36 selects and outputs the value Cc of the CCD signal in 10 bits at the pixel "c".

In case that the value Cc of the CCD signal at the pixel "c" is extremely larger than the maximum value C0H of CCD signals of neighboring pixels, which indicate a same color component as that of the pixel "c", and further a value of subtracting the maximum value C0H from the value Cc of the CCD signal at the pixel "c" exceeds the threshold value WKS, in other words, possibility of presenting a pixel of white defect in the pixel "c" is very high, the CMP 34 outputs "1".

Since a subtracted value outputted from the subtracter 32 is a positive value, an MSB out of 10 bits of subtracted value outputted from the subtracter 32 is "0". The value "0" is inverted into "1" and the inverted value "1" is inputted to the CMP 34.

Accordingly, the AND circuit 35 outputs a value "1" and the selector 36 selects and outputs the maximum value C0H. The pixel of white defect of the pixel "c" is compensated by replacing the CCD signal of the pixel "c" with the maximum value C0H.

On the other hand, in case that the value Cc of the CCD signal at the pixel "c" is not so larger than the maximum value C0H of CCD signals of neighboring pixels, which indicate a same color component as that of the pixel "c", and further a value of subtracting the maximum value C0H from the value Cc of the CCD signal at the pixel "c" does not exceed the threshold value WKS, in other words, possibility of not presenting a pixel of white defect in the pixel "c" is very high, the CMP 34 outputs "0". Accordingly, the AND circuit 35 outputs a value "0" and the selector 36 outputs the value Cc of the CCD signal at the pixel "c" as it is.

In case that the value Cc of the CCD signal at the pixel "c" is smaller than the maximum value C0H of CCD signals of neighboring pixels, which indicate a same color component as that of the pixel "c", in other words, a pixel of white defect is not presented in the pixel "c", a subtracted value outputted from the subtracter 32 is a negative value.

Since an MSB of 10 bits of subtracted value outputted by the subtracter 32 is "1" and the value "1" is inverted into "0" and the inverted value "0" is inputted to the AND circuit 35, the AND circuit 35 outputs a value "0". Accordingly, the selector 36 outputs the value Cc of the CCD signal of the pixel "c" as it is.

While the invention has been described above with reference to the embodiment of replacing a value of a CCD signal of a specific pixel with a maximum value of CCD signals of neighboring pixels, which indicate a same color component as that of the specific pixel, whenever it is discriminated that a pixel of white defect is presented in the specific pixel. However, it is apparent that many changes, modifications and variations in the arrangement of equipment and devices can be made without departing from the invention concept disclosed herein. For example, a value of a CCD signal of a specific pixel can be replaced by a mean value of CCD signals of neighboring pixels, which indicate a same color component as that of the specific pixel, whenever is it discriminated that a pixel of white defect is presented in the specific pixel.

According to the aspect of the present invention, a pixel defect can be accurately compensated since a pixel defect is discriminated by extracting only information composed of a same color component from a CCD signal, which is outputted from a solid-state image sensor of an all-pixel readout system. In addition thereto, a pixel defect can be compensated without deteriorating resolution.

What is claimed is:

1. A pixel defect compensating apparatus comprising:

extracting means for extracting a pixel signal from an array of pixel signals, which is outputted from a solid-state image sensor of an all-pixel readout system and indicates one color component out of a plurality of color components of pixel information of one pixel within a predetermined area of a picture, wherein said pixel signal is composed of a same color component;

pixel defect discriminating means for comparing pixel information of a specific pixel in the pixel signal extracted by said extracting means with pixel information of other pixels than said specific pixel in said pixel signal and for discriminating whether or not pixel defect is present in said specific pixel; and pixel defect compensating means for compensating pixel information of said specific pixel by using pixel information of pixels other than said specific pixel in said pixel signal and for outputting a compensated pixel information when said specific pixel is discriminated by said pixel defect discriminating means such that a pixel defect is present, and for outputting said pixel information of said specific pixel as it is when said specific pixel is discriminated by said pixel defect discribinating means such that a pixel defect is not present in said specific pixel;

said pixel defect compensating apparatus is further characterized in that said pixel defect compensating means compensates pixel information of upper and lower pixels adjacent to said specific pixel simultaneously.

2. A method of compensating pixel defect comprising the steps of: extracting a pixel signal from an array of pixel signals, which is outputted from a solid-state image sensor of an all-pixel readout system and indicates one color component out of a plurality of color components of pixel information of one pixel within a predetermined area of a picture, wherein said signal is composed of a same color component;

comparing pixel information of a specific pixel in the pixel signal extracted by said step of extracting with pixel information of other pixels than said specific pixel in said pixel signal;

discriminating whether or not pixel defect is present in said specific pixel;

compensating pixel information of said specific pixel by using pixel information of pixels other than said specific pixel in said pixel signal when said specific pixel is discriminated by said pixel defect discriminating means such that pixel defect is present;

firstly outputting a compensated pixel information when it is discriminated that pixel defect is present in said specific pixel; and secondly outputting said pixel information of said specific pixel as it is when said specific pixel is discriminated by said step of discriminating such that pixel defect is not present in said specific pixel, said method is further characterized in that pixel information of upper and lower pixels adjacent to said specific pixel is compensated simultaneously.

3. The method of compensating pixel defect in accordance with claim 2, wherein said step of discriminating pixel defect further discriminates that there is a pixel defect in said specific pixel when a value of subtracting a maximum signal level of pixels other than said specific pixel from a signal level of said specific pixel exceeds a predetermined value, and wherein said step of compensating pixel information of said specific pixel further compensates pixel information of said specific pixel by replacing the value of signal level of said specific pixel with the value of said maximum signal level, in case of being discriminated that a pixel defect is present in said specific pixel.

* * * * *